US012094642B2

(12) United States Patent
Shimoyasu et al.

(10) Patent No.: US 12,094,642 B2
(45) Date of Patent: Sep. 17, 2024

(54) MULTILAYER INDUCTOR COMPONENT

(71) Applicant: TDK CORPORATION, Tokyo (JP)

(72) Inventors: Masashi Shimoyasu, Tokyo (JP); Daiki Kato, Tokyo (JP); Yoji Tozawa, Tokyo (JP); Takashi Endo, Tokyo (JP); Seiichi Nakagawa, Tokyo (JP); Mitsuru Ito, Yurihonjo (JP); Kenta Sasaki, Yurihonjo (JP); Akihiko Oide, Tokyo (JP); Makoto Yoshino, Tokyo (JP); Kazuhiro Ebina, Tokyo (JP)

(73) Assignee: TDK CORPORATION, Tokyo (JP)

( * ) Notice: Subject to any disclaimer, the term of this patent is extended or adjusted under 35 U.S.C. 154(b) by 630 days.

(21) Appl. No.: 17/329,348

(22) Filed: May 25, 2021

(65) Prior Publication Data

US 2021/0375527 A1 Dec. 2, 2021

(30) Foreign Application Priority Data

Jun. 2, 2020 (JP) ................................ 2020-096115

(51) Int. Cl.

*H01F 5/00* (2006.01)
*H01F 27/28* (2006.01)
*H01F 27/29* (2006.01)
*H01F 41/04* (2006.01)

(52) U.S. Cl.

CPC ......... *H01F 27/29* (2013.01); *H01F 27/2804* (2013.01); *H01F 41/043* (2013.01); *H01F 2027/2809* (2013.01)

(58) Field of Classification Search

CPC ...................................................... H01F 27/29
USPC ........................................................ 336/200
See application file for complete search history.

(56) References Cited

U.S. PATENT DOCUMENTS

2017/0018362 A1 1/2017 Nishisaka et al.
2018/0090271 A1 3/2018 Ito et al.
2019/0156988 A1* 5/2019 Nakamura .......... H01F 27/2804
2021/0043363 A1* 2/2021 Ooi .................... H01F 27/2852

FOREIGN PATENT DOCUMENTS

JP H04-280616 A 10/1992
JP H06-096986 A 4/1994
JP H07-192967 A 7/1995
JP 2017-028253 A 2/2017
JP 2018-060999 A 4/2018

* cited by examiner

*Primary Examiner* — Ronald Hinson
(74) *Attorney, Agent, or Firm* — Oliff PLC

(57) ABSTRACT

A multilayer inductor component includes an element body, an internal conductor, and an external electrode. The internal conductor is disposed in the element body. The external electrode is disposed on a surface of the element body and electrically connected to the internal conductor. The external electrode includes a sintered metal layer and a plating layer. The sintered metal layer is disposed on the surface of the element body. The plating layer covers the sintered metal layer. The sintered metal layer includes a thick portion and thin portions. The thick portion covers the surface of the element body. A plurality of glass particles is dispersed in the thick portion. The thin portions cover glass particles exposed on a surface of the thick portion among the plurality of glass particles and being in contact with the plating layer.

16 Claims, 5 Drawing Sheets

MULTILAYER INDUCTOR COMPONENT

TECHNICAL FIELD

One aspect of the present disclosure relates to a multilayer inductor component.

BACKGROUND

Japanese Unexamined Patent Publication No. H04-280616 discloses a multilayer ceramic capacitor including a bare chip, terminal electrodes baked on both ends of the bare chip, and plating layers formed on surfaces of the terminal electrodes. In this multilayer ceramic capacitor, excess inorganic binder that has appeared on the surface of the terminal electrode after firing is removed by polishing to improve the adhesion of the plating layer to the terminal electrode.

SUMMARY

Since an inductor generates heat more easily than other electronic components such as a capacitor, solder used for mounting the inductor is required to have heat resistance. A high-strength solder having excellent heat resistance is harder than a normal solder and is inferior in shock absorption. Therefore, the plating layer is easily peeled off after mounting when the high-strength solder is used for mounting the inductor.

An object of one aspect of the present disclosure is to provide a multilayer inductor component in which the adhesion of a plating layer is further improved.

A multilayer inductor component according to an aspect of the present disclosure includes an element body, an internal conductor, and an external electrode. The internal conductor is disposed in the element body. The external electrode is disposed on a surface of the element body and electrically connected to the internal conductor. The external electrode includes a sintered metal layer and a plating layer. The sintered metal layer is disposed on the surface of the element body. The plating layer covers the sintered metal layer. The sintered metal layer includes a thick portion and thin portions. The thick portion covers the surface of the element body. A plurality of glass particles is dispersed in the thick portion. The thin portions cover glass particles exposed on a surface of the thick portion among the plurality of glass particles and being in contact with the plating layer.

In the multilayer inductor component, the sintered metal layer further includes the thin portions in addition to the thick portion. The thin portions cover the glass particles exposed on the surface of the thick portion. The thin portions are in contact with the plating layer. Due to the thin portions, the plating layer is also formed in close contact with the glass particles exposed on the surface of the thick portion. Therefore, the adhesion of the plating layer to the sintered metal layer is further improved.

The thickness of each of the thin portions may be less than the thickness of the plating layer. In this case, unevenness of the surface of the sintered metal layer can be reduced. As a result, the current distribution in the electroplating step becomes uniform. Therefore, the plating layer can be uniformly formed.

The thickness of the thin portions may be 1.0 μm or less. In this case, the unevenness of the surface of the sintered metal layer can be further reduced. As a result, the current distribution in the electroplating step becomes more uniform. Therefore, the plating layer can be formed more uniformly.

The element body may include an end surface, a side surface, and a ridge portion. The side surface may be disposed adjacent to the end surface. The ridge portion may be disposed between the end surface and the side surface. The external electrode may be disposed over the end surface, the side surface, and the ridge portion. A coverage of the thin portions covering the glass particles exposed on the surface of the thick portion is greater at the ridge portion than at the end surface. In this case, the adhesion of the plating layer at the ridge portion is further improved.

The thin portions and the thick portion may include the same metal. In this case, the deposition property of the plating layer becomes more uniform.

DETAILED DESCRIPTION

Figure 1:
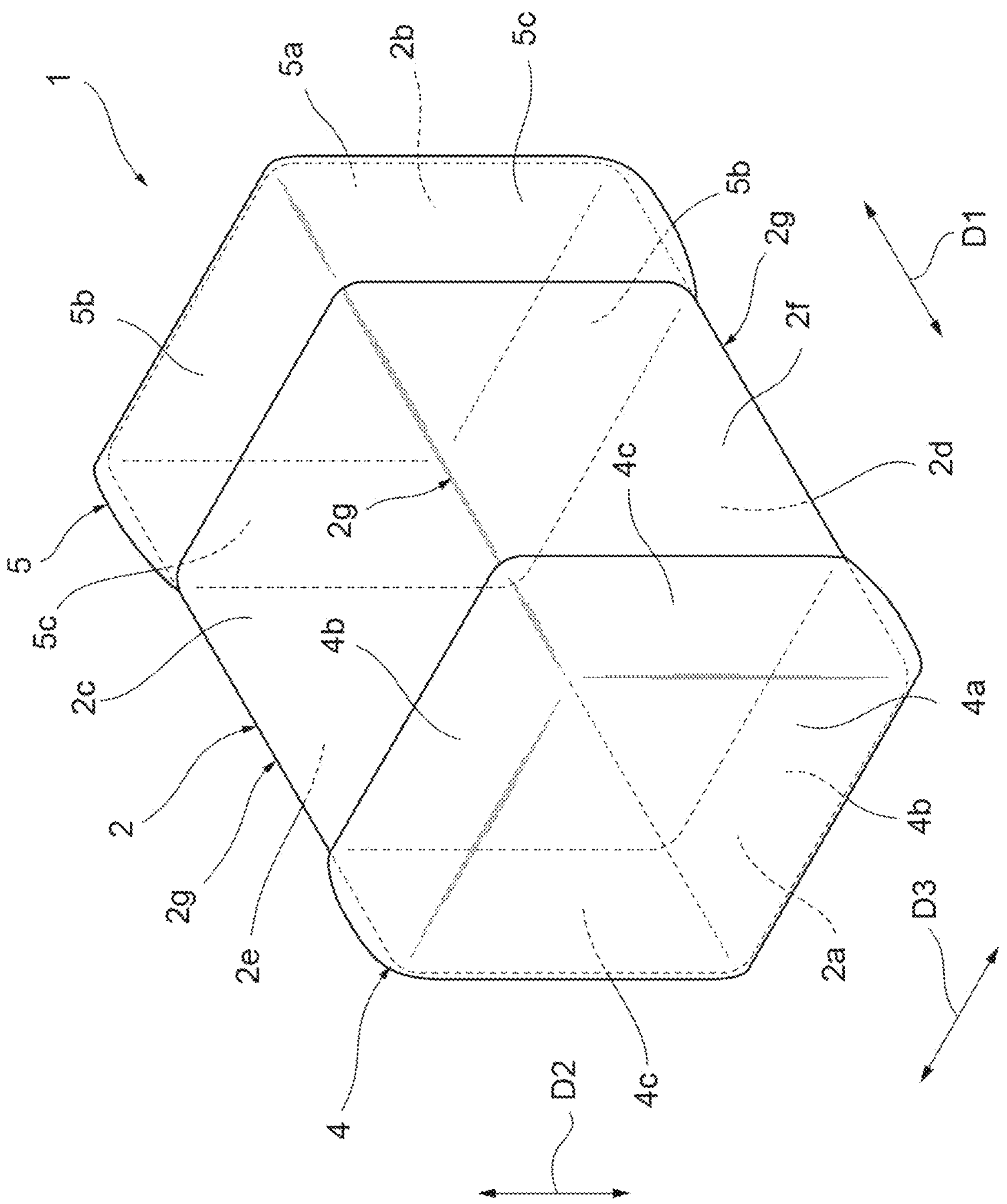
FIG. 1 is a perspective view showing a multilayer inductor component according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
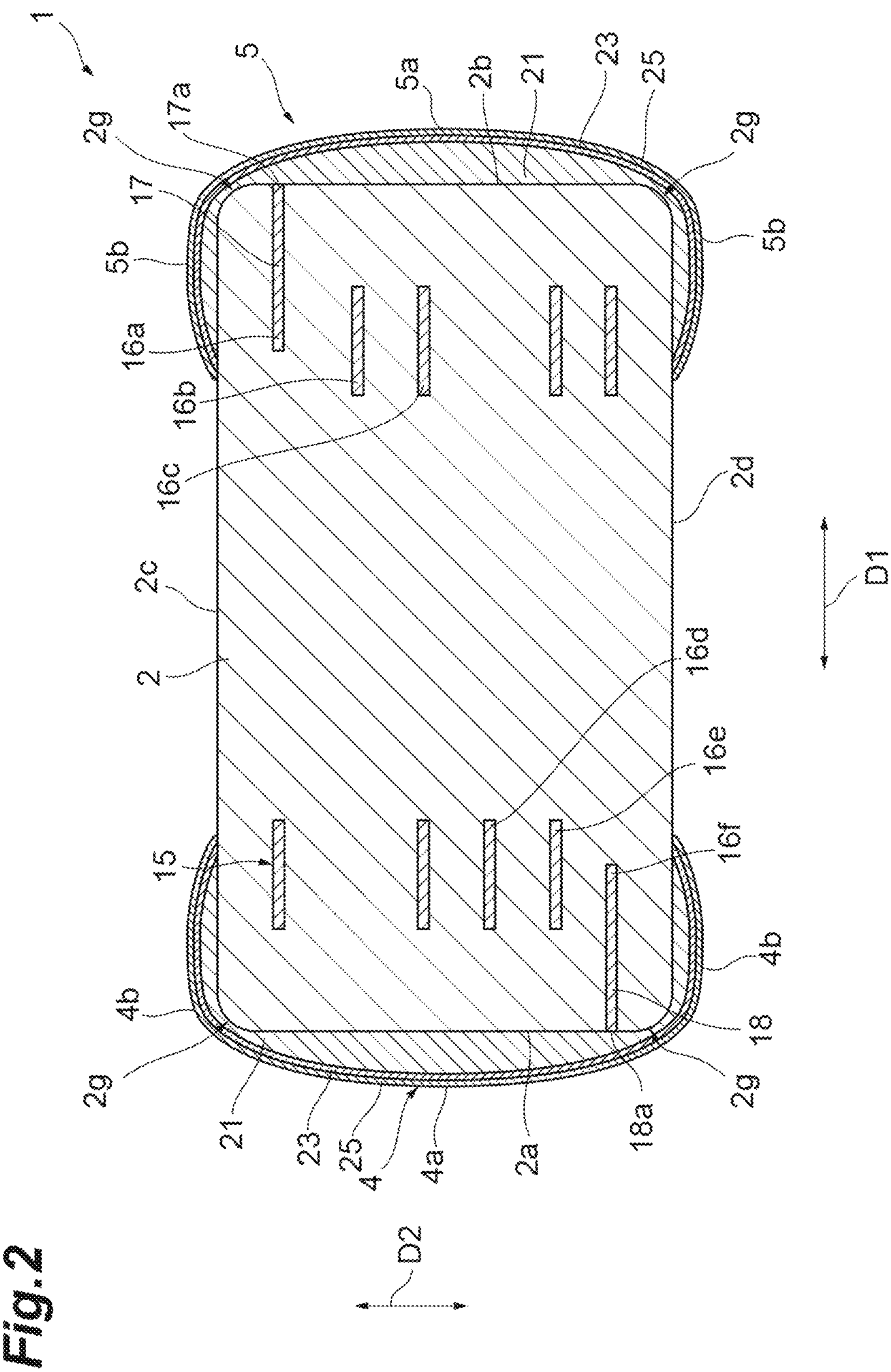
FIG. 2 is a cross-sectional view of the multilayer inductor component of FIG. 1.
Figure 3:
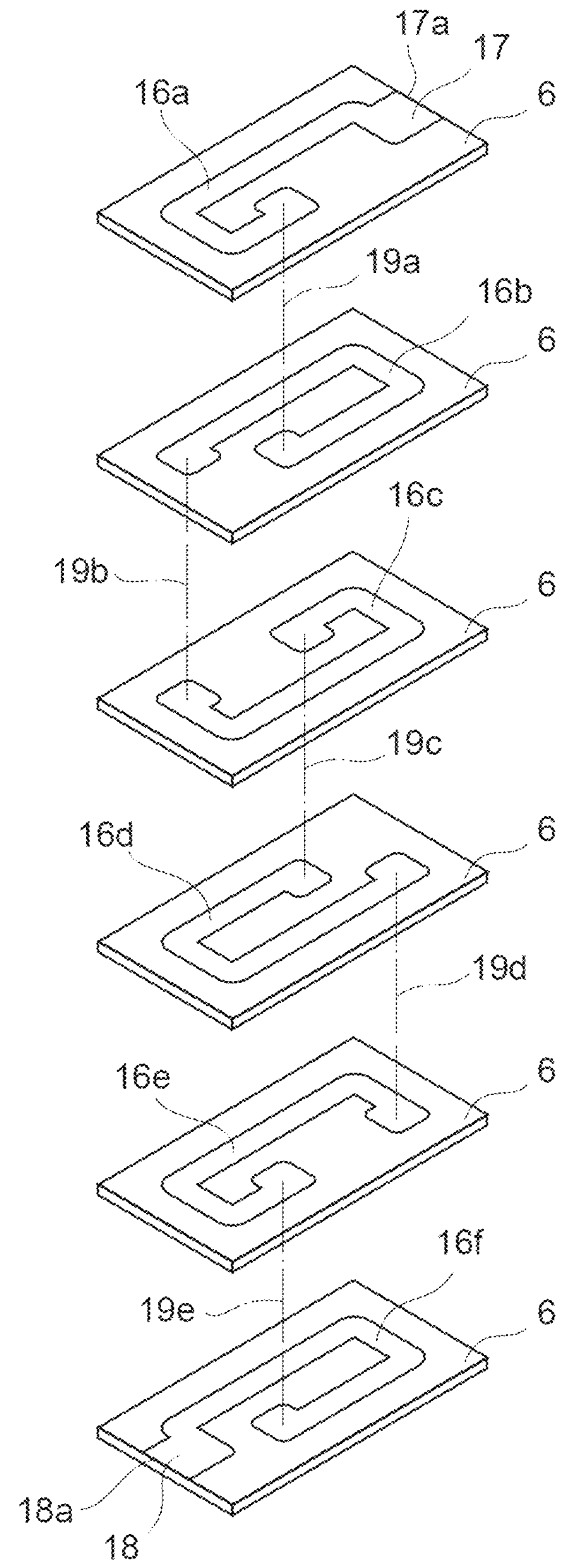
FIG. 3 is an exploded perspective view showing a configuration of an internal conductor.

A configuration of a multilayer inductor component 1 according to a present embodiment will be described with reference to FIGS. 1 to 3. FIG. 1 is a perspective view showing a multilayer inductor component according to an embodiment. FIG. 2 is a cross-sectional view of the multilayer inductor component of FIG. 1. FIG. 3 is an exploded perspective view showing a configuration of an internal conductor.

As shown in FIG. 1, the multilayer inductor component 1 includes an element body 2 having a rectangular parallelepiped shape and a pair of external electrodes 4,5 disposed on a surface of the element body 2. The pair of external electrodes 4,5 are disposed at both end portions of the element body 2 and are separated from each other. The rectangular parallelepiped shape includes a rectangular parallelepiped shape in which corner portions and ridge portions are chamfered and a rectangular parallelepiped shape in which corner portions and ridge portions are rounded. The multilayer inductor component 1 can be applied to, for example, a bead inductor or a power inductor.

The element body 2 has a rectangular parallelepiped shape. The element body 2 has, as its surfaces, a pair of end surfaces 2*a* and 2*b* and four side surfaces 2*c*, 2*d*, 2*e*, and 2*f*. The end surfaces 2*a* and 2*b* are opposed to each other. The side surfaces 2*c* and 2*d* are opposed to each other. The side surfaces 2*e* and 2*f* are opposed to each other. The end surfaces 2*a* and 2*b* are adjacent to the four side surfaces 2*c*, 2*d*, 2*e*, and 2*f*, respectively. The side surface 2*c* or the side surface 2*d* constitutes a mounting surface. The mounting surface is defined as a surface opposed to another electronic device (not shown) when the multilayer inductor component 1 is mounted on the other electronic device (for example, the circuit substrate or an electronic component).

In the present embodiment, the direction in which the pair of end surfaces 2_a_ and 2_b_ opposed to each other (the first direction D1) is the length direction of the element body 2. The direction in which the pair of side surfaces 2_c_ and 2_d_ opposed to each other (second direction D2) is the height direction of the element body 2. The direction in which the pair of side surfaces 2_e_ and 2_f_ opposed to each other (third direction D3) is the width direction of the element body 2. The first direction D1, the second direction D2, and the third direction D3 are orthogonal to each other.

The length of the element body 2 in the first direction D1 is longer than the length of the element body 2 in the second direction D2 and the length of the element body 2 in the third direction D3. The length of the element body 2 in the second direction D2 is equal to the length of the element body 2 in the third direction D3. That is, in the present embodiment, the end surfaces 2_a_ and 2_b_ have square shapes, and the four side surfaces 2_c_, 2_d_, 2_e_, and 2_f_ have rectangular shapes. The length of the element body 2 in the first direction D1 may be equal to the length of the element body 2 in the second direction D2 and the length of the element body 2 in the third direction D3. The length of the element body 2 in the second direction D2 and the length of the element body 2 in the third direction D3 may be different from each other.

In addition to equality, values including a slight difference within a preset range, a manufacturing error, or the like may be "equal". For example, when a plurality of values is included in a range of ±5% of an average value of the plurality of values, the plurality of values is defined to be equal.

The end surfaces 2_a_ and 2_b_ extend in the second direction D2 in such a way to connect the pair of side surfaces 2_c_ and 2_d_. That is, the end surfaces 2_a_ and 2_b_ extend in a direction intersecting the side surfaces 2_c_ and 2_d_. The end surfaces 2_a_ and 2_b_ also extend in the third direction D3. The pair of side surfaces 2_c_ and 2_d_ extend in the first direction D1 in such a way to connect the pair of end surfaces 2_a_ and 2_b_. The pair of side surfaces 2_c_ and 2_d_ also extend in the third direction D3. The pair of side surfaces 2_e_ and 2_f_ extend in the second direction D2 in such a way to connect the pair of side surfaces 2_c_ and 2_d_. The pair of side surfaces 2_e_ and 2_f_ also extend in the first direction D1.

The element body 2 includes 12 ridge portions 2_g_ disposed between two adjacent surfaces among the pair of end surfaces 2_a_ and 2_b_ and the four side surfaces 2_c_, 2_d_, 2_e_, and 2_f_. The 12 ridge portions 2_g_ include a ridge portion 2_g_ disposed between the side surface 2_c_ and the side surface 2_e_, a ridge portion 2_g_ disposed between the side surface 2_e_ and the side surface 2_d_, a ridge portion 2_g_ disposed between the side surface 2_d_ and the side surface 2_f_, a ridge portion 2_g_ disposed between the side surface 2_f_ and the side surface 2_c_, a ridge portion 2_g_ disposed between the end surface 2_a_ and the side surface 2_c_, a ridge portion 2_g_ disposed between the end surface 2_a_ and the side surface 2_d_, a ridge portion 2_g_ disposed between the end surface 2_a_ and the side surface 2_e_, a ridge portion 2_g_ disposed between the end surface 2_a_ and the side surface 2_f_, a ridge portion 2_g_ disposed between the end surface 2_b_ and the side surface 2_c_, a ridge portion 2_g_ disposed between the end surface 2_b_ and the side surface 2_d_, a ridge portion 2_g_ disposed between the end surface 2_b_ and the side surface 2_e_, and a ridge portion 2_g_ disposed between the end surface 2_b_ and the side surface 2_f_.

The element body 2 is formed by stacking a plurality of insulator layers 6 (see FIG. 3). The element body 2 includes a plurality of laminated insulator layers 6. The plurality of insulator layers 6 are stacked in a direction in which the side surface 2_c_ and the side surface 2_d_ are opposed to each other. That is, the stacking direction of the plurality of insulator layers 6 coincides with the direction in which the side surface 2_c_ and the side surface 2_d_ are opposed to each other. Hereinafter, the direction in which the side surface 2_c_ and the side surface 2_d_ are opposed to each other is also referred to as a "stacking direction". Each insulator layer 6 has a substantially rectangular shape. In the actual element body 2, the insulator layers 6 are integrated in such a way that boundaries between the layers 6 cannot be visually recognized.

Each insulator layer 6 is formed of a sintered body of a ceramic green sheet containing a ferrite material (for example, a Ni—Cu—Zn-based ferrite material, a Ni—Cu—Zn—Mg-based ferrite material, or a Ni—Cu-based ferrite material). That is, the element body 2 is made of a ferrite sintered body.

The multilayer inductor component 1 further includes, as internal conductors disposed inside the element body 2, a plurality of coil conductors 16_a_, 16_b_, 16_c_, 16_d_, 16_e_, and 16_f_, a pair of connection conductors 17,18 and, and a plurality of through-hole conductors 19_a_, 19_b_, 19_c_, 19_d_, and 19_e_. The coil conductors 16_a_ to 16_f_ constitute the coil 15 inside the element body 2. The coil conductors 16_a_ to 16_f_ include a conductive material (for example, Ag or Pd). The coil conductors 16_a_ to 16_f_ are formed as sintered bodies of a conductive paste containing a conductive material (for example, Ag powder or Pd powder).

The connection conductor 17 is connected to the coil conductor 16_a_. The connection conductor 17 is disposed on the end surface 2_b_ side of the element body 2. The connection conductor 17 has an end portion 17_a_ exposed on the end surface 2_b_. The end portion 17_a_ is exposed at a position closer to the side surface 2_c_ than the center portion of the end surface 2_b_ when viewed from the direction orthogonal to the end surface 2_b_. The end portion 17_a_ is connected to the external electrode 5. That is, the coil conductor 16_a_ is electrically connected to the external electrode 5 through the connection conductor 17. In the present embodiment, the conductor pattern of the coil conductor 16_a_ and the conductor pattern of the connection conductor 17 are formed integrally and continuously.

The connection conductor 18 is connected to the coil conductor 16_f_. The connection conductor 18 is disposed on the end surface 2_a_ side of the element body 2. The connection conductor 18 has an end portion 18_a_ exposed on the end surface 2_a_. The end portion 18_a_ is exposed at a position closer to the side surface 2_d_ than the center portion of the end surface 2_a_ when viewed from the direction orthogonal to the end surface 2_a_. The end portion 18_a_ is connected to the external electrode 4. That is, the coil conductor 16_f_ is electrically connected to the external electrode 4 through the connection conductor 18. In the present embodiment, the conductor pattern of the coil conductor 16_f_ and the conductor pattern of the connection conductor 18 are formed integrally and continuously.

The coil conductors 16_a_ to 16_f_ are arranged side by side in the lamination direction of the insulator layers 6 in the element body 2. The coil conductors 16_a_ to 16_f_ are arranged in the order of the coil conductor 16_a_, the coil conductor 16_b_, the coil conductor 16_c_, the coil conductor 16_d_, the coil conductor 16_e_, and the coil conductor 16_f_ from the side closer to the side surface 2_c_.

The through-hole conductors 19_a_ to 19_e_ connect ends of the coil conductors 16_a_ to 16_f_ to each other. The coil conductors 16_a_ to 16_f_ are electrically connected to each other by through-hole conductors 19$a$ to 19$e$. The coil 15 is configured by electrically connecting a plurality of coil conductors 16$a$ to 16$f$. Each of the through-hole conductors 19$a$ to 19$e$ contains a conductive material (for example, Ag or Pd). Like the coil conductors 16$a$ to 16$f$, each of the through-hole conductors 19$a$ to 19$e$ is configured as a sintered body of a conductive paste containing a conductive material (for example, Ag powder or Pd powder).

The through-hole conductors 19$a$ to 19$e$ are arranged side by side in the stacking direction of the insulator layers 6 in the element body 2. The plurality of through-hole conductors 19$a$ to 19$e$ are arranged in the order of the through-hole conductor 19$a$, the through-hole conductor 19$b$, the through-hole conductor 19$c$, the through-hole conductor 19$d$, and the through-hole conductor 19$e$ from the side closer to the side surface 2$c$.

The external electrode 4 is located at an end portion on the end surface 2$a$ side of the element body 2 when viewed from the first direction D1. The external electrode 4 includes an electrode portion 4$a$ located on the end surface 2$a$, electrode portions 4$b$ located on the side surfaces 2$c$ and 2$d$, and electrode portions 4$c$ located on the side surfaces 2$e$ and 2$f$. That is, the external electrode 4 is formed on the five surfaces 2$a$, 2$c$, 2$d$, 2$e$, and 2$f$. The external electrode 4 is disposed over the end surface 2$a$ and the side surfaces 2$c$, 2$d$, 2$e$, and 2$f$ adjacent to each other.

The electrode portions 4$a$, 4$b$, and 4$c$ adjacent to each other are connected and electrically connected to each other at the ridge portions 2$g$ of the element body 2. The electrode portion 4$a$ and each of the electrode portions 4$b$ are connected at the ridge portion 2$g$ between the end surface 2$a$ and each of the side surfaces 2$c$ and 2$d$. The electrode portion 4$a$ and each of the electrode portions 4$c$ are connected at the ridge portion 2$g$ between the end surface 2$a$ and each of the side surfaces 2$e$ and 2$f$. Each of the electrode portion 4$b$ and each of the electrode portion 4$c$ are connected at the ridge portion 2$g$ between each of the side surfaces 2$c$ and 2$d$ and each of the side surfaces 2$e$ and 2$f$.

The electrode portion 4$a$ is disposed in such a way to entirely cover the end portion 18$a$ of the connection conductor 18 exposed at the end surface 2$a$, and the connection conductor 18 is directly connected to the external electrode 4. That is, the connection conductor 18 connects the coil conductor 16$a$ (one end of the coil 15) and the electrode portion 4$a$. Thus, the coil 15 is electrically connected to the external electrode 4.

The external electrode 5 is located at an end portion on the end surface 2$b$ side of the element body 2 when viewed from the first direction D1. The external electrode 5 includes an electrode portion 5$a$ located on the end surface 2$b$, an electrode portions 5$b$ located on the side surfaces 2$c$ and 2$d$, and an electrode portions 5$c$ located on the side surfaces 2$e$ and 2$f$. That is, the external electrodes 5 are formed on the five surfaces 2$b$, 2$c$, 2$d$, 2$e$, and 2$f$. The external electrode 5 is disposed over the end surface 2$b$ and the side surfaces 2$c$, 2$d$, 2$e$, and 2$f$ adjacent to each other.

The electrode portions 5$a$, 5$b$, and 5$c$ adjacent to each other are connected and electrically connected to each other at the ridge portions 2$g$ of the element body 2. The electrode portion 5$a$ and each of the electrode portions 5$b$ are connected at a ridge portion 2$g$ between the end surface 2$b$ and each of the side surfaces 2$c$ and 2$d$. The electrode portion 5$a$ and each of the electrode portions 5$c$ are connected at a ridge portion 2$g$ between the end surface 2$b$ and each of the side surfaces 2$e$ and 2$f$. Each of the electrode portion 5$b$ and each of the electrode portion 5$c$ are connected at a ridge portion 2$g$ between each of the side surfaces 2$c$ and 2$d$ and each of the side surfaces 2$e$ and 2$f$.

The electrode portion 5$a$ is disposed in such a way to entirely cover the end portion 17$a$ of the connection conductor 17 exposed at the end surface 2$b$, and the connection conductor 17 is directly connected to the external electrode 5. That is, the connection conductor 17 connects the coil conductor 16$f$ (the other end of the coil 15) and the electrode portion 5$a$. Thus, the coil 15 is electrically connected to the external electrode 5.

Each of the external electrodes 4,5 includes a sintered metal layer 21, a first plating layer 23, and a second plating layer 25. That is, the electrode portions 4$a$, 4$b$, and 4$c$ and the electrode portions 5$a$, 5$b$, and 5$c$ include the sintered metal layer 21, the first plating layer 23, and the second plating layer 25, respectively. The second plating layer 25 constitutes the outermost layer of the external electrode 4,5.

The sintered metal layer 21 is disposed on the surface of the element body 2. The sintered metal layer 21 is formed by applying a conductive paste to the surface of the element body 2, baking the conductive paste, and then forming the thin portions 35 described later. As the conductive paste, for example, a mixture of a conductor component, a glass component, an organic binder, and an organic solvent is used. The conductor component is, for example, a metal powder such as Ag or Cu. In the present embodiment, the conductor component is Ag powder.

In the sintered metal layer 21, the thickness of the portion disposed on the end surfaces 2$a$ and 2$b$ (the sintered metal layer 21 included in the electrode portions 4$a$ and 5$a$) decreases toward the ridge portion 2$g$ and increases toward the central portion of the end surfaces 2$a$ and 2$b$. In the sintered metal layer 21, the thickness of the portion disposed on the end portion 17$a$ of the connection conductor 17 is not less than the thickness of the portion disposed in the central portion of the end surface 2$b$ or not less than ½ of the maximum thickness of the portion disposed on the end surface 2$b$. In the sintered metal layer 21, the thickness of the portion disposed on the end portion 18$a$ of the connection conductor 18 is not less than the thickness of the portion disposed in the central portion of the end surface 2$a$ or not less than ½ of the maximum thickness of the portion disposed on the end surface 2$a$.

Figure 4A:
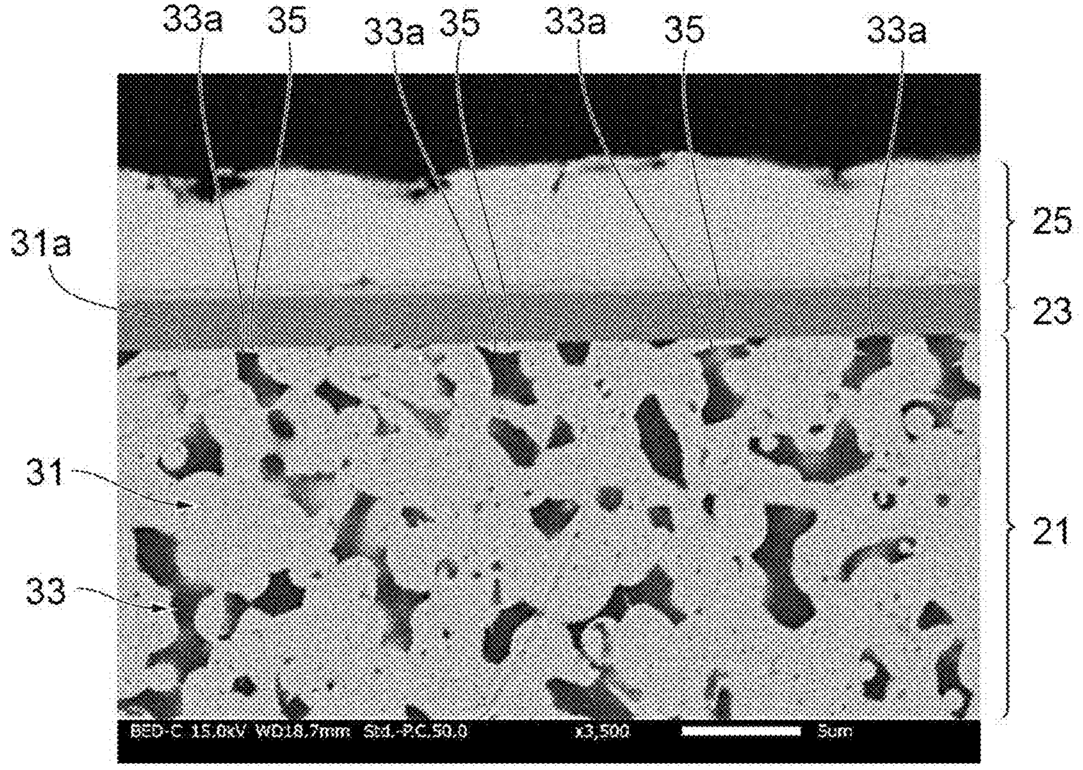
FIGS. 4A and 4B are photographs showing an example of cross sections of an external electrode.
Figure 4B:
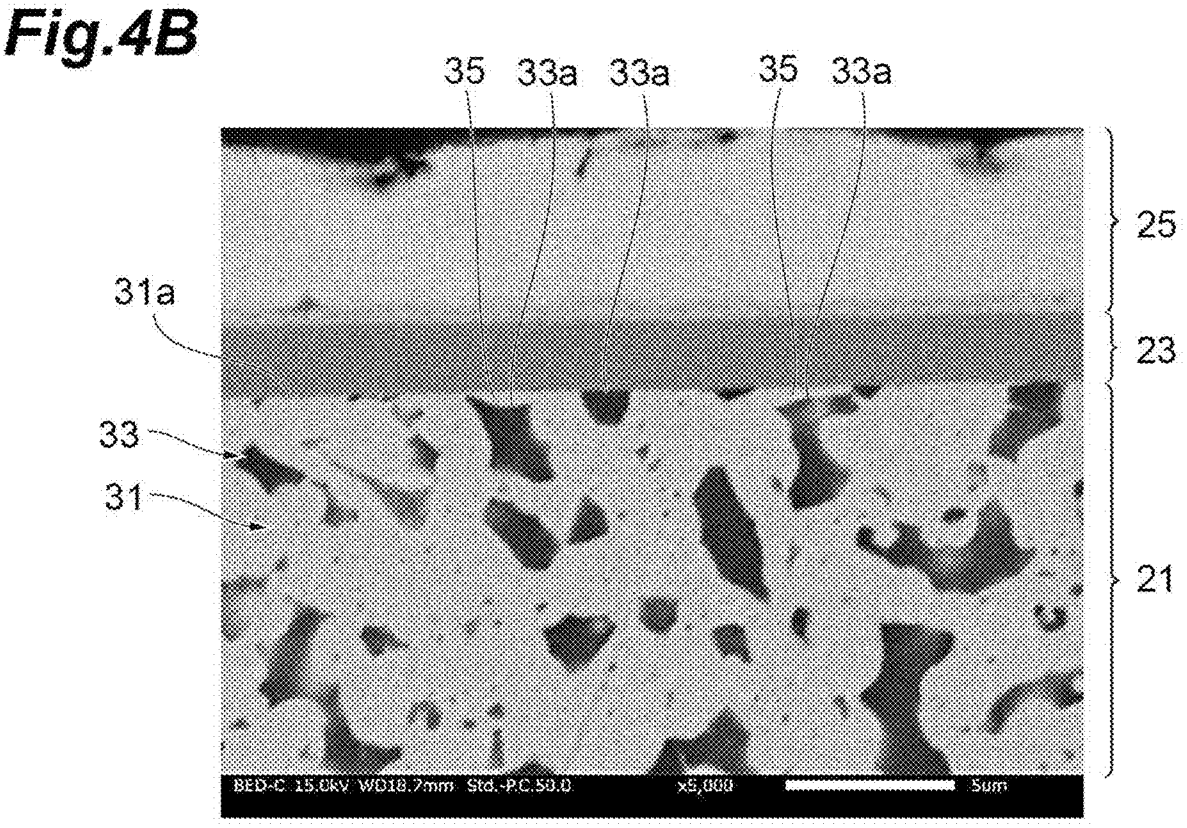

FIGS. 4A and 4B are photographs showing an example of a cross-section of the external electrode. FIG. 4A is a 3500×SEM photograph, and FIG. 4B is a 5000×SEM photograph. In FIG. 4A and FIG. 4B, for explanation, reference numerals are given to the respective parts, but the respective parts are not limited to the forms shown in the figures. The sintered metal layer 21 includes a thick portion 31, a plurality of glass particles 33, and thin portions 35.

The thick portion 31 covers the surface of the element body 2. The thick portion 31 is a portion having the same thickness as the sintered metal layer 21. The thickness of the thick portion 31 is greater than at least the thickness of the first plating layer 23. The thickness of the thick portion 31 is, for example, 2.5 μm or more and 50 μm or less. The thick portion 31 has a surface 31$a$ facing the first plating layer 23 side. The thick portion 31 is formed by sintering a conductor component contained in the conductive paste. The thick portion 31 is made of a metal such as Ag or Cu. In the present embodiment, the thick portion 31 is made of Ag.

The thick portion 31 constitutes a majority of the sintered metal layer 21. The proportion (occupancy) of the thick portion 31 in the sintered metal layer 21 is, for example, 50% or more and 95% or less. The occupancy of the thick portion 31 is obtained, for example, as follows. First, a cross-sectional view of the sintered metal layer 21 is obtained. The cross-sectional view is, for example, a cross-sectional view of sintered metal layer 21 taken along a plane parallel to a pair of surfaces (for example, a pair of side surfaces 2*e* and 2*f*) opposed each other and located at an equal distance from the pair of surfaces. Subsequently, the sum of the area of the thick portion 31 and the area of the sintered metal layer 21 in the obtained cross-sectional view are calculated. Finally, the sum of the obtained area of the thick portion 31 is divided by the area of the sintered metal layer 21, and the obtained quotient is defined as the occupancy of the thick portion 31 in the sintered metal layer 21. A plurality of cross-sectional views may be obtained, and the respective quotients may be obtained for each cross-sectional view. In this case, an average value of a plurality of obtained quotients may be used as the occupancy.

The plurality of glass particles 33 is dispersed in the thick portion 31. The glass particles 33 are substantially uniformly dispersed throughout the thick portion 31. A part of the glass particles 33 is exposed on the surface 31*a* of the thick portion 31. That is, the part of the glass particles 33 has exposed portions 33*a* exposed on the surface 31*a*. Another part of the glass particles 33 is disposed inside the thick portion 31 in such a way that the entire surface thereof is covered by the thick portion 31.

The proportion (occupancy) of the glass particles 33 in the sintered metal layer 21 is, for example, 5% or more and 50% or less. The occupancy of the glass particles 33 is obtained by the same method as the occupancy of the thick portion 31. First, a cross-sectional view of the sintered metal layer 21 is obtained. Subsequently, the sum of the cross-sectional areas of the glass particles 33 and the cross-sectional area of the sintered metal layer 21 are obtained. Finally, the sum of the areas of the glass particles 33 is divided by the area of the sintered metal layer 21, and the obtained quotient is defined as the occupancy of the glass particles 33 in the sintered metal layer 21. A plurality of cross-sectional views may be obtained, and an average value of a plurality of obtained quotients may be used as the occupancy.

The thin portions 35 cover the glass particles 33 exposed on the surface 31*a* of the thick-film-like portion 31 among the plurality of glass particles 33. The thin portions 35 are in contact with the first plating layer 23. The thin portions 35 is a thin layer of conductor. The thin portion 35 is made of a metal such as Ag or Cu, for example. In the present embodiment, the thin portion 35 is made of the same metal (that is, Ag) as the metal constituting the thick-film-like portion 31. The thickness of the thin portion 35 is, for example, greater than 0 and equal to or less than 1.0 μm. The thickness of the thin portion 35 may be 0.5 μm or less. The thickness of the thin portion 35 is ½ or less of the thickness of the first plating layer 23. The thickness of the thin portion 35 may be ⅓ or less of the thickness of the first plating layer 23, or may be ¼ or less.

The thin portions 35 cover at least a portion of the exposed portion 33*a*. Among the plurality of exposed portions 33*a*, there may be an exposed portion 33*a* not covered with the thin portions 35. The coverage of the thin portions 35 covering the glass particles 33, that is, the coverage of the thin portions 35 covering the exposed portion 33*a* is obtained, for example, as follows. First, a cross-sectional view of the sintered metal layer 21 is obtained in the same manner as in the case of obtaining the occupancy described above. Subsequently, in the acquired cross-sectional view, the sum of the lengths of the exposed portions 33*a* and the sum of the lengths of the thin portions 35 are calculated. Finally, the calculated sum of the lengths of the thin portions 35 is divided by the sum of the lengths of the exposed portions 33*a*, and the obtained quotient is defined as the coverage of the thin portions 35 covering the glass particles 33. A plurality of cross-sectional views may be obtained, and an average value of a plurality of obtained quotients may be used as the coverage.

The thin portions 35 are formed after applying a conductive paste to the surface of the element body 2 and firing. The thin portions 35 are formed by, for example, surface treatment using ultrasonic waves. Specifically, the element body 2 on which the conductive paste is baked is put into an ultrasonic bath together with water and media balls, and ultrasonic waves are generated. As the media balls, for example, zirconia balls are used. The ultrasonic vibration causes the media balls to hit the surface of the sintered metal layer 21. As a result, the unevenness of the surface of the sintered metal layer 21 can be reduced, and the flatness of the surface of the sintered metal layer 21 can be improved.

Since metal is ductile, the thick portion 31 is stretched by being hit by the media ball. As a result, the thin portions 35 covering the exposed portion 33*a* of the glass particle 33 are formed. In the sintered metal layer 21, the portion formed on the ridge portion 2*g* is more easily brought into contact with the media ball than the portions formed on the end surfaces 2*a* and 2*b* and the side surfaces 2*c*, 2*d*, 2*e*, and 2*f*. Therefore, on the ridge portion 2*g*, the thin portions 35 are more easily formed than on the end surfaces 2*a* and 2*b* and the side surfaces 2*c*, 2*d*, 2*e*, and 2*f*. Therefore, the coverage of the thin portions 35 covering the glass particles 33, that is, the coverage of the thin portions 35 covering the exposed portion 33 is greater at each ridge portion 2*g* between each end surface 2*a*, 2*b* and each side surface 2*c*, 2*d*, 2*e*, 2*f* than at each end surface 2*a*, 2*b*. The coverage at the end surfaces 2*a* and 2*b* is, for example, 60% or more and 80% or less. The coverage at the ridge portion 2*g* is, for example, 85% or more and 99% or less.

Figure 5A:
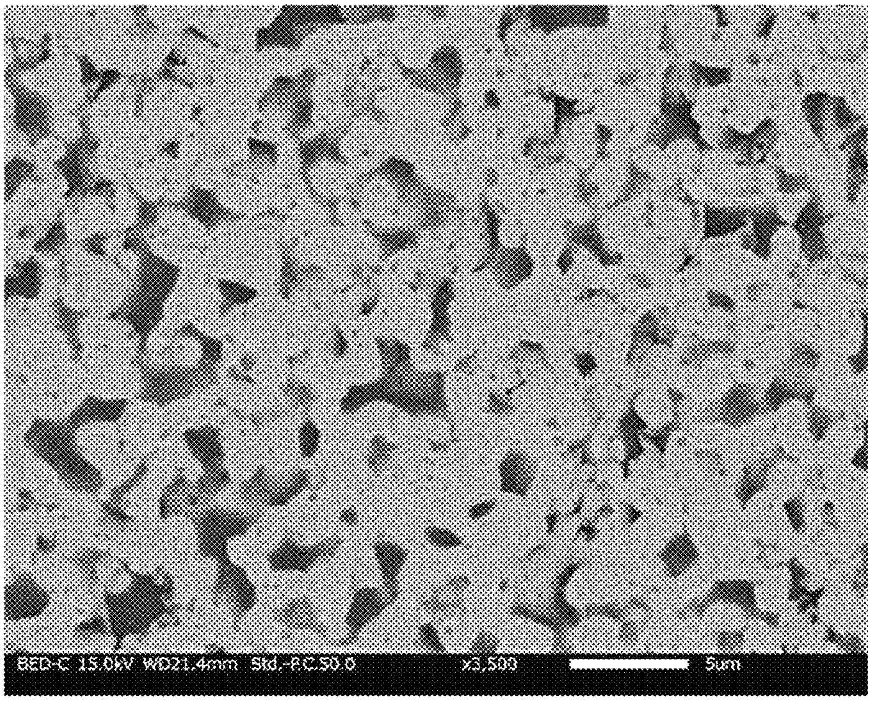
FIGS. 5A and 5B are photographs showing an example of surfaces of a sintered metal layer.
Figure 5B:
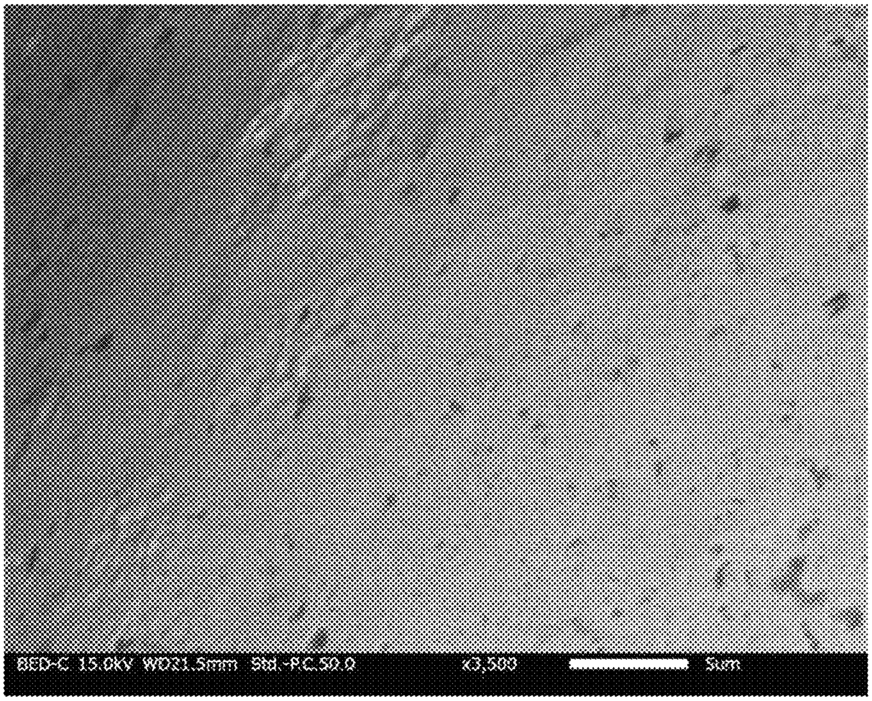

FIGS. 5A and 5B are photographs showing an example of surface of sintered metal layer. FIG. 5A is an SEM photograph of the sintered metal layer formed on the end surface at a magnification of 3500 times. FIG. 5B is an SEM photograph of the sintered-metal layer formed on the ridge portion at a magnification of 3500 times. In the sintered-metal layer formed on the end surface, as shown in FIG. 5A, a large number of exposed portions of the glass particles (portions shown in dark color) are exposed on the surfaces of the thick portion (portions shown in light color). On the other hand, as shown in FIG. 5B, in the sintered-metal layer formed in the ridge portion, the exposed portions of the glass particles (portions shown in dark color) are hardly exposed on the surfaces of the thick portion (portions shown in light color).

The first plating layer 23 covers the sintered metal layer 21. The first plating layer 23 covers the sintered metal layer 21 with a substantially uniform thickness. The thickness of the first plating layer 23 is, for example, 0.5 μm or more and 5.0 μm or less. The first plating layer 23 is formed on the sintered metal layer 21 by plating. The first plating layer 23 is, for example, a Ni plating layer and contains Ni.

The second plating layer 25 covers the first plating layer 23. The second plating layer 25 covers the first plating layer 23 with a substantially uniform thickness. The thickness of the second plating layer 25 is, for example, 1.5 μm or more and 10.0 μm or less. The second plating layer 25 is formed on the first plating layer 23 by plating. The second plating layer 25 is, for example, a Sn plating layer and contains Sn.

The multilayer inductor component 1 may further include a third plating layer (not shown) covering the second plating layer 25. In this case, for example, the first plating layer 23 may be a Cu plating layer, the second plating layer 25 may be a Ni plating layer, and the third plating layer may be a Sn plating layer.

As described above, in the multilayer inductor component 1, the sintered metal layer 21 further includes the thin portions 35 in addition to the thick portion 31. The thin portions 35 cover the glass particles 33 exposed on the surface 31*a* of the thick portion 31. The thin portions 35 are in contact with the first plating layer 23. The thin portions 35 cover at least a part of the exposed portion 33*a* of the glass particles 33. Due to the thin portions 35, the first plating layer 23 are also formed in close contact with the glass particles 33 exposed on the surface 31*a* of the thick portion 31. Therefore, the adhesion of the first plating layer 23 to the sintered metal layer 21 is further improved. Therefore, even when the laminated inductor component 1 is mounted with a hard high-strength solder, interfacial peeling between the sintered metal layer 21 and the first plating layer 23 can be suppressed. In addition, even when the laminated inductor component 1 is used as an on-vehicle chip bead in a high-temperature environment and stress is applied due to a difference in thermal expansion coefficient, peeling of the first plating layer 23 can be suppressed.

Since the first plating layer 23 is also formed on the exposed portion 33*a* via the thin portion 35*s*, the continuity of the first plating layer 23 is improved. As a result, not only the adhesiveness of the first plating layer 23 but also the flatness of the surface of the first plating layer 23 can be improved.

The thickness of the thin portion 35 is smaller than the thickness of the first plating layer 23, and is, for example, 1.0 μm or less. By suppressing the thickness of the thin portion 35, the unevenness of the surface of the sintered metal layer 21 can be reduced, and the flatness of the surface of the sintered metal layer 21 can be improved. As a result, since the current distribution in the electroplating step becomes uniform, the first plating layer 23 can be formed uniformly. In addition, the influence of the thin portions 35 on the characteristics of the sintered metal layer 21 can be reduced. In the present embodiment, the thin portions 35 are made of the same metal as the metal constituting the thick-film-like portion 31. The deposition properties vary from material to material. By using the same material, the deposition property of the first plating layer 23 becomes more uniform. Also, in this respect, the influence of the thin portions 35 on the characteristics of the sintered metal layer 21 can be reduced.

The coverage at which the thin portions 35 cover the glass particles 33 exposed on the surface 31*a* of the thick portion 31 is greater at the ridge portion 2*g* than at the end surfaces 2*a* and 2*b*. Therefore, the adhesion of the first plating layer 23 to the ridge portion 2*g* is further improved. In the solder-mounted multilayer inductor component 1, stress tends to concentrate on the ridge portion 2*g*. Since the adhesion of the first plating layer 23 is further improved on the ridge portion 2*g*, the peeling of the first plating layer 23 can be suppressed.

Although the embodiments and modifications of the present invention have been described above, the present invention is not necessarily limited to the embodiments and modifications, and the embodiment can be variously changed without departing from the scope of the invention.

The multilayer inductor component 1 may not include the second plating layer 25. The multilayer inductor component 1 may have a linear conductor as an internal conductor instead of the coil conductors 16*a* to 16*f*.

What is claimed is:

1. A multilayer inductor component comprising:
an element body including:
an end surface;
a side surface disposed adjacent to the end surface; and
a ridge portion disposed between the end surface and the side surface;
an internal conductor disposed in the element body; and
an external electrode disposed over the end surface, the side surface, and the ridge portion of the element body and electrically connected to the internal conductor, wherein
the external electrode includes:
a sintered metal layer disposed on the end surface, the side surface, and the ridge portion of the element body; and
a plating layer covering the sintered metal layer,
the sintered metal layer includes:
a thick portion covering the end surface, the side surface, and the ridge portion of the element body and in which a plurality of glass particles is dispersed; and
thin portions covering glass particles exposed on a surface of the thick portion among the plurality of glass particles and being in contact with the plating layer, and
a coverage of the thin portions covering the glass particles exposed on the surface of the thick portion is greater at the ridge portion than at the end surface.

2. The multilayer inductor component according to claim 1, wherein
a thickness of each of the thin portions is smaller than a thickness of the plating layer.

3. The multilayer inductor component according to claim 1, wherein
a thickness of each of the thin portions is 1.0 μm or less.

4. The multilayer inductor component according to claim 1, wherein
the coverage at the end surface is 60% or more and 80% or less.

5. The multilayer inductor component according to claim 1, wherein
the coverage at the ridge portion is 85% or more and 99% or less.

6. The multilayer inductor component according to claim 1, wherein
the side surface constitutes a mounting surface.

7. The multilayer inductor component according to claim 1, wherein
the thin portions and the thick portion include the same metal.

8. The multilayer inductor component according to claim 1, wherein
the thick portion includes Ag.

9. The multilayer inductor component according to claim 1, wherein
the thick portion includes Cu.

10. The multilayer inductor component according to claim 1, wherein
a maximum thickness of the thick portion is equal to a thickness of the sintered metal layer.

11. The multilayer inductor component according to claim 1, wherein
a thickness of the thick portion is 2.5 μm or more and 50 μm or less.

12. The multilayer inductor component according to claim 1, wherein the plating layer includes a first plating layer covering the sintered metal layer and a second plating layer covering the first plating layer.

13. The multilayer inductor component according to claim 12, wherein a thickness of the thick portion is greater than a thickness of the first plating layer.

14. The multilayer inductor component according to claim 12, wherein a thickness of the first plating layer is 0.5 μm or more and 5.0 μm or less.

15. The multilayer inductor component according to claim 1, wherein the internal conductor includes a plurality of coil conductors, and the plurality of coil conductors is electrically connected to each other to constitute a coil.

16. The multilayer inductor component according to claim 15, wherein the internal conductor includes a through-hole conductor, and the plurality of coil conductors is electrically connected to each other by the through-hole conductor.

* * * * *